United States Patent Office 3,645,947
Patented Feb. 29, 1972

3,645,947
LACTONE-DIENE-VINYL-AROMATIC TERPOLYMER EMULSIONS
Donald J. Quigg and James N. Short, Bartlesville, Okla., assignors to Phillips Petroleum Company
No Drawing. Filed June 25, 1970, Ser. No. 49,997
Int. Cl. C08d 9/10
U.S. Cl. 260—28.5                    10 Claims

ABSTRACT OF THE DISCLOSURE

Rubber emulsions, comprising (a) a lactone terpolymer, solvent, emulsifying agent and water or (b) a lactone terpolymer, asphalt, solvent, emulsifying agent and water and optionally containing conventional additives such as tackifiers and extender oils, are provided for stabiliing loose soil formations, highway surfaces, railroad ballast, and the like.

---

This invention relates to novel rubber emulsions and rubber-asphalt emulsions.

It is frequently desirable to treat soil, railroad beds, roads or soil adjacent to roads or airport runways in order either to stabilize these areas against wind and rain erosion or to retain the strength of the roadbeds or to control dust. While many systems have been provided for stabilizing soil, railroad ballast and asphalt pavement, which systems utilize a variety of formulations or treating systems to impart the desired stability, such systems are not satisfactory for all such purposes due to their lack of stability, low green strength (when rubber emulsions are used), or rapid deterioration.

The present invention provides novel stabilization systems which distinguish over the prior art systems in that the inventive emulsions produce a binding composition of excellent performance because of their high tensile strength and high ozone resistance. Moreover, their ease of emulsification and long shelf life make these emulsion systems particularly convenient.

Accordingly, it is an object of this invention to provide novel and improved emulsion systems for effecting the stabilization of soil, roadbeds, railroad beds, and the like.

Other objects, advantages and features of the invention will be readily apparent from a reading of the following disclosure.

In accordance with this invention, we have discovered that rubber emulsion systems containing as the rubbery component a lactone terpolymer of the type hereafter described result in improved emulsion systems for treating soils, highways, railroad beds, and the like, due to their increased tensile strength and high ozone resistance. In addition, our emulsion concentrates are particularly convenient because they are easily emulsified and are of sufficient stability to exhibit long shelf life.

The ingredients in the emulsion concentrates of the present invention are proportioned as follows:

| Ingredient | Broad, percent | Preferred, percent |
|---|---|---|
| Lactone terpolymer | 3-30 | 5-15 |
| Asphalt | 0-50 | 5-35 |
| Solvent | 5-50 | 10-20 |
| Emulsifier | 0.5-6 | 1.5-4 |
| Other solids and oils | 0-50 | 5-35 |
| Water | 25-80 | 30-50 |

In general, the rubber, asphalt and other solids and oils content of the emulsion concentrate will generally be in the range of from about 35 to about 60 weight percent. Extender oils when used, are present in amounts of 1 to 10 parts oil per part terpolymer. In all cases, sufficient water and emulsifying agent should be present to provide a stable emulsion of the ingredients of the composition. The volatile terpolymer solvent will generally be present in amounts of from about 1 to about 4 weight parts of solvent per part of terpolymer.

Any convenient organic solvent capable of forming a cement with the lactone terpolymer can be used. These can include hydrocarbon solvents as well as halogenated derivatives thereof. Such solvents or solvent mixtures preferably have a boiling point in the range of from about 200–400° F. Aromatic solvents, such as xylenes, are presently preferred.

The novel lactone terpolymer-containing emulsions of the present invention can be prepared by any suitable method known to the art. Generally speaking, the ingredients of the emulsion are blended together in a high-speed mixing device, usually one with high shear characteristics. An example of a frequently used device of this nature is a Charlotte colloid mill. It is generally convenient to conduct the emulsifying operation by bringing together, in the mill, a stream of the suitable oil phase ingredients and a stream of the suitable water phase ingredients. For example, the water phase, or "soap solution," is first prepared by mixing in any convenient manner the emulsifying agent with the desired quantity of water. The oil phase consists of the solid ingredients of the emulsion suitably mixed with the organic solvents and preferably heated to reduce the viscosity of the oil phase.

Usually the aqueous phase is warmed ot a temperature of about 90–200° F., preferably 90–125° F. The oil phase can be heated to a temperature in the range of 150–350° F., preferably 250–300° F., depending on the nature of the ingredients and the viscosity of the mixture. The warm aqueous phase and the hot oil phase are then proportioned to the colloid mill to emulsify the mixture, during which milling the temperature of the mixture can be in the range of 100–210° F., preferably 150–200° F. The completed emulsion then can be cooled to a temperature below 150° F. before being used or transferred to storage.

When emulsions are prepared which contain both the lactone terpolymer cement and asphalt, it can sometimes be convenient to emulsify the asphalt separately and the terpolymer separately. The two emulsions can then be combined, using conventional low-shear mixing devices, to provide the asphalt- and terpolymer-containing emulsions of this invention.

The term "lactone terpolymer" as used herein is intended to include those terpolymers which contain from about 20 to about 60 weight percent of a conjugated diene such as butadiene, from about 10 to about 40 weight percent of a monovinyl-substituted aromatic such as styrene, and from about 10 to about 50 weight percent of a lactone such as ε-caprolactone. In the terpolymer the polymerized lactone is present as a terminal segment. In the remainder of the terpolymer molecule, the conjugated diene and the monovinyl-substituted aromatic can be present either as individual blocks of these polymerized monomers or as a block of random copolymer of both of these, or as a mixture of both random segments or homopolymer segments of these two monomers.

The conjugated dienes which are applicable contain from about 4 to about 12 carbon atoms per molecule, some examples of these being 1,3-butadiene, isoprene, piperylene, 6-phenyl-1,3-hexadiene, and the like.

Suitable monovinyl-substituted aromatic monomers are those having from 8 to about 12 carbon atoms per molecule. Examples of these are styrene, alpha-methylstyrene, 4-methylstyrene, 4-isopropylstyrene, 2,4-dimethylstyrene, 1-vinylnaphthalene, 2-vinylnaphthalene and the like, and mixtures thereof.

Suitable lactones are those containing from about 3 to 18 carbon atoms per molecule. Some examples are β-propiolactone, Δ-valerolactone, ε-caprolactone, and lactones corresponding to the following acids: 2-methyl-3-hydroxypropionic acid, 3-hydroxynonanoic acid, 2-dodecyl - 3 - hydroxypropionic acid, 2 - cyclopentyl - 3 - hydroxypropionic acid, 3 - phenyl - 3 - hydroxypropionic acid, and the like, and mixtures thereof.

The lactone terpolymers above described can be prepared by any suitable method which will provide a solid rubbery terpolymer. For example, a block copolymer of butadiene and styrene can be prepared using an initiator such as butyllithium. The still "living" copolymer is then contacted with a suitable amount of lactone, preferably in the presence of a polymerization promoter such as an isocyanate compound, and the polymerization is allowed to continue to essential completion in order to form the terpolymer. Thus, for example, appropriate amounts of butadiene and styrene can be copolymerized in the presence of an initiator such as butyllithium at a temperature in the range of from about 30° to about 250° F., preferably in the presence of a promoter such as a polar organic compound such as tetrahydrofuran. It is presently preferred to first form a block of polystyrene, then to add the butadiene and allow a polybutadiene block to be formed. Immediately afterward, and while the copolymer is still metalated, the lactone is added and allowed to polymerize at 30° to 250° F., preferably in the presence of a promoter such as an isocyanate or polyisocyanate compound. At the completion of the polymerization, the reaction mixture is shortstopped and the terpolymer is recovered by methods conventional in the rubber art. The above-described polymerizations are generally carried out in an inert diluent, and the terpolymer can be recovered in the form of a cement, if desired.

In one presently preferred embodiment of the invention, the lactone terpolymer used in the emulsion systems is a styrene-butadiene caprolactone block terpolymer containing from 10 to 40 percent styrene, 20 to 60 percent butadiene and 10 to 50 percent caprolactone.

The term "asphalt" as used herein includes bituminous materials containing asphaltenes or tarry constituents and comprises such bituminous materials as, for example, petroleum residues, pitches, road oils, albino asphalts, asphalt cutbacks, solutions or dispersions, and cracked, straight-run or natural asphalts. Such asphalt materials as used herein can be characterized as being asphalts having an ASTM D5 penetration value in the range of 0 to 300.

When asphalt is to be present in the concentrate, the asphalt can be readily added to the lactone terpolymer cement either before or after dilution of the cement.

Ordinarily, in preparing the emulsion systems of this invention, an emulsifying agent is employed. Any suitable emulsifying agent can be used. The emulsifiers can be anionic, cationic or nonionic. A large number of such emulsifying agents are well known in the emulsion art. Anionic emulsifiers include soaps such as the alkali metal soaps of $C_{12-20}$ fatty acids, rosin acids, tolyl acids, alkaryl sulfonic acids, and the like. Cationic emulsifying agents in clude aliphatic amines, aromatic amines with fatty acid chains, fatty amides, quaternary ammonium salts, polyethylene diamines and their quaternary ammonium derivatives, alkyl imidazolines, and the like. Nonionic emulsifying agents include polyoxyethylene derivatives of alcohols, acids, ethers, phenols, amides, or amines. The nonionic emulsifiers are presently preferred because they can provide long-lasting and uniform emulsions. Particularly preferred are the nonionic emulsifiers typified by the polyoxyethylene derivatives of alkylated phenols.

In addition to the terpolymer, the emulsifying agents, and the asphalt ingredients, the emulsions of this invention can contain minor amounts of other materials such as tackifiers, plasticizers, extenders, inhibitors, pigments, antiozonants, and the like. Some examples of such optional ingredients are disproportionated rosin acids, hydrogenated rosin acids, coumarone-indene resins, extending aromatic or paraffinic petroleum oils, cyclopentadiene resins, pinene polymers, terpene polymers, esters of rosin acids, gum rosins, paraindene resins, paracoumarone resins, bentonite clay, carbon black, petroleum resins, as well as other synthetic and natural resins.

Prior to use, the emulsion concentrate can be diluted with water to any desired extent. Generally, from about 1 to about 25 volumes of water are mixed with each volume of the emulsion concentrate. This mixing can be carried out in any convenient low-shear mixing apparatus. Still higher dilutions can be carried out, if desired, up to the point at which the emulsion may be caused to break prematurely.

The emulsion concentrates or the diluted emulsions of this invention are applied to the desired substrates in amounts sufficient to obtain the desired stabilizing result. This will depend on the nature of the substrate and the nature and concentration of the emulsion utilized. A convenient rate of application is in the range of from about 0.1 to about 2 gallons per square yard. In terms of solids deposited on the substrate, beneficial results can be obtained by applying sufficient emulsion to provide from about 0.01 to about 1.0 pound of solid per square yard.

The novel emulsion of the present invention, when uniformly applied to a substrate, is capable of forming a film or blanket over that substrate which adheres to soil particles. Depending on the rate of application, the film can be substantially continuous and can be either impervious or porous.

The following examples are presented to illustrate further the invention.

EXAMPLE I

A 25/50/25 block styrene/butadiene/ε-caprolactone terpolymer was prepared using the following recipe:

| Ingredient: | Parts, by wt. |
|---|---|
| Cyclohexane | 780 |
| Styrene | 25 |
| Butadiene | 50 |
| ε-Caprolactone | 25 |
| PAPI [1] | 0.40 |
| Tetrahydrofuran | 0.05 |
| n-Butyllithium | 0.011 |

[1] A commercially available polyisocyanate (polymethylene polyphenylisocyanate) of about 3 isocyanate groups per molecule and of an average molecular weight of about 380.

The cyclohexane was charged to the reactor first, followed by a nitrogen purge. The temperature was raised to 158° F. The styrene, the tetrahydrofuran, and the n-butyllithium were then charged to the reactor. Polymerization of styrene was continued to essential completion in 30 minutes. The butadiene was the charged and reacted to essential completion in 1.25 hours. The temperature was increased to 194° F. and the caprolactone and polyisocyanate were then charged. The reaction mixture was polymerized to essential completion again in 3.0 hours. Isopropanol, containing a small amount of antioxidant, was then added to shortstop the mixture. The terpolymer was found to have a Mooney viscosity (ML-4 at 270° F.) of 55.5.

EXAMPLE II

An emulsion system was prepared in accordance with formulation I as described below in Table I using a styrene/butadiene/caprolactone block terpolymer cement (from Example I).

A similar emulsion (formulation II) was prepared as described in Table I which additionally contained asphalt, an oil extender and a tackifying resin.

The emulsion systems were tested in a soil adhesion test wherein one part of the emulsion was diluted with 19 parts water and the diluted emulsion was applied to dried river sand at an application rate of 0.5 gallon/yards². After drying at 110–120° F. for about 5 hours to remove water and solvent, the treated sand was subjected to a sieve analysis. Any adhesion or agglomeration of the particles was noted by a decrease in the amount of smaller particles and a corresponding increase in the larger sieve fractions. In these tests, the percentage in materials smaller than No. 28 mesh can be used as an index to determine the relative susceptibility of a soil to wind erosion.

TABLE I

| Emulsion No. | I | II |
|---|---|---|
| Composition: | | |
| Terpolymer [1] | 15.3 | 5.3 |
| Asphalt | | 10.6 |
| Extender oil | | 10.6 |
| Resin [2] | | 21.1 |
| Xylene | 45.8 | 11.9 |
| Emulsifier [3] | 2.9 | 3.0 |
| Water | 36.0 | 37.5 |
| Sieve analysis: | | |
| >4 mesh | 10.98 | 77.86 |
| 4–10 mesh | 11.74 | 2.64 |
| 10–28 mesh | 36.16 | 6.63 |
| 28–65 mesh | 35.81 | 10.92 |
| 65–200 mesh | 5.22 | 1.95 |
| <200 mesh | 0.10 | 0.0 |
| Total <28 mesh | 41.13 | 12.87 |

[1] Butadiene/styrene/caprolactone block terpolymer.
[2] Tackifier—petroleum-derived indene resin.
[3] Nonionic emulsifier, mixture of octylphenoxypoly-(ethyleneoxy) ethanols having about 30 ethyleneoxy groups in the chain.

EXAMPLE III

For purposes of comparison, two further emulsion systems (III and IV) were prepared essentially identically to systems I and II of Example II but containing, instead of the terpolymer, a block copolymer of butadiene and styrene. The resulting systems were tested in a manner as described for the systems of Example II. The formulations and results of the tests are shown in Table II.

TABLE II

| Emulsion No. | III | IV |
|---|---|---|
| Composition: | | |
| Copolymer [1] | 10.7 | 5.4 |
| Asphalt [2] | | 10.9 |
| Extender oil [3] | | 10.9 |
| Resin [4] | | 21.7 |
| Xylene | 42.6 | 12.1 |
| Emulsifier [5] | 2.3 | 2.9 |
| Water | 44.4 | 36.1 |
| Sieve analysis: | | |
| >4 mesh | 0.0 | 2.80 |
| 4–10 mesh | 6.76 | 9.71 |
| 10–28 mesh | 28.03 | 24.19 |
| 28–65 mesh | 54.20 | 55.43 |
| 65–200 mesh | 10.76 | 7.18 |
| <200 mesh | 0.25 | 0.05 |
| Total <28 mesh | 65.21 | 62.66 |

[1] Styrene/butadiene block copolymer (Solprene 406).
[2] 85/100 penetration (K.C.).
[3] Philrich 5 extender oil.
[4] Tackifier—Petroleum-derived indene resin (Pennsylvania Industrial Chem. Co.).
[5] Nonionic emulsifier, mixture of octylphenoxypolyethyleneoxy) ethanols with about 30 ethyleneoxy groups in the chain.

In Example II, the asphalt-containing emulsion (II) was prepared by mixing the water and the emulsifying agent and then heating this aqueous phase to 129° F. The other ingredients, including the asphalt and the xylene terpolymer cement, were mixed together and this oil phase was heated to 152° F. While the aqueous phase was allowed to recirculate through a colloid mill at a rotor clearance of 0.004 inch, the oil phase was added to the mill over a 3-minute period. The rotor clearance was then changed to 0.002 inch and the emulsion was allowed to discharge from the mill. The other emulsions (I, III and IV) were prepared in a similar manner.

Comparison of the sieve analyses data of Examples I and III indicates that the terpolymer-containing emulsion is superior to the copolymer-containing emulsions in each of the two types of formulations. It is particularly pointed out that the inventive emulsions resulted in much less <28 mesh particles than the comparison emulsions. In addition to these performance results, it was found that the terpolymer-containing emulsions were more quickly emulsified and the emulsions were more stable. A sample of the emulsion, after standing for about three months, showed no significant degradation.

Reasonable variations and modifications can be made in the foregoing disclosure without departing from the spirit and scope thereof.

We claim:
1. An emulsion system which comprises
   (a) from 3 to 30 weight percent of a lactone terpolymer, said lactone terpolymer containing from 20 to 60 weight percent conjugated diene having from 4 to 12 carbon atoms per molecule, from 10 to 40 weight percent of a monovinyl-substituted aromatic compound having from 8 to 12 carbon atoms per molecule, and from 10 to 50 weight percent of a polymerized saturated lactone having from 3 to 18 carbon atoms per molecule of lactone, wherein said terpolymer is formed of a segment of said conjugated diene compound and monovinyl-substituted aromatic compound present as individual homopolymer blocks of each of said compounds, as a block of a random copolymer of each of said compounds, or as a mixture of both random and homopolymer blocks of said compounds and said polymerized lactone segment is present as a terminal segment,
   (b) from 5 to 50 weight percent of a solvent for said lactone terpolymer,
   (c) from 25 to 80 weight percent of water, and
   (d) from 0.5 to 6 weight percent of an emulsifying agent.

2. An emulsion system according to claim 1 having additionally present 0 to 50 weight percent asphalt.

3. An emulsion system according to claim 1 having additionally present 0 to 50 weight percent extender oil.

4. A composition according to claim 1 wherein said terpolymer contains from 10 to 40 weight percent styrene, from 20 to 60 weight percent butadiene and from 10 to 50 weight percent caprolactone.

5. An emulsion system according to claim 1 wherein said lactone terpolymer contains 50 weight percent butadiene, 25 weight percent styrene and 25 weight percent ε-caprolactone and said solvent is xylene.

6. An emulsion system according to claim 2 wherein said lactone terpolymer contains 50 weight percent butadiene, 25 weight percent styrene and 25 weight percent ε-caprolactone and said solvent is xylene.

7. An emulsion system according to claim 2 having additionally present 0 to 50 weight percent extender oil.

8. A process for the stabilization of a porous substrate which comprises contacting said substrate with an emulsion system which comprises
   (a) from 3 to 30 weight percent of a lactone terpolymer, said lactone terpolymer containing from 20 to 60 weight percent conjugated diene having from 4 to 12 carbon atoms per molecule, from 10 to 40 weight percent of a monovinyl-substituted aromatic compound having from 8 to 12 carbon atoms per molecule, and from 10 to 50 weight percent of a polymerized saturated lactone having from 3 to 18 carbon atoms per molecule of lactone, wherein said terpolymer is formed of a segment of said conjugated diene compound and monovinyl-substituted aromatic compound present as individual homopolymer blocks of each of said compounds, as a block of a random copolymer of each of said compounds, or as a mixture of both random and homopolymer blocks of said compounds and said polymerized lactone segment is present as a terminal segment, (b) from 5 to 50 weight percent of a solvent for said lactone terpolymer,
(c) from 25 to 80 weight percent of water, and
(d) from 0.5 to 6 weight percent of an emulsifying agent.

9. A process according to claim 8 wherein said emulsion has additionally present from 0 to 50 weight percent asphalt.

10. A process according to claim 9 wherein said emulsion has additionally present from 0 to 50 weight percent extender oil.

References Cited
UNITED STATES PATENTS

| | | | |
|---|---|---|---|
| 3,029,221 | 4/1962 | Welch | 260—874 |
| 3,352,808 | 11/1967 | Leibowitz | 260—879 |
| 3,489,819 | 1/1970 | Busler | 260—823 |

MORRIS LIEBMAN, Primary Examiner

P. R. MICHL, Assistant Examiner

U.S. Cl. X.R.

94—20; 260—29.7 NR, 33.6 GA, 33.6 AQ, 823